US00RE39620E

(19) United States
(12) Reissued Patent
Smith

(10) Patent Number: US RE39,620 E
(45) Date of Reissued Patent: May 8, 2007

(54) GPS AIRBORNE TARGET GEOLOCATING METHOD

(75) Inventor: Patrick Lawrence Smith, Manhattan Beach, CA (US)

(73) Assignee: The Aerospace Corporation, El Segundo, CA (US)

(21) Appl. No.: 11/084,867

(22) Filed: Mar. 18, 2005

Related U.S. Patent Documents

Reissue of:
(64) Patent No.: 6,535,816
Issued: Mar. 18, 2003
Appl. No.: 10/166,525
Filed: Jun. 10, 2002

(51) Int. Cl.
*G01C 21/00* (2006.01)

(52) U.S. Cl. ..... 701/213; 701/207; 701/214; 701/215; 701/222

(58) Field of Classification Search ..... 701/207, 701/213, 214, 215, 222, 225, 200, 205, 206; 73/178 R; 33/300, 304, 313; 342/385, 386, 342/149, 152, 387
See application file for complete search history.

(56) References Cited

U.S. PATENT DOCUMENTS

| | | | | |
|---|---|---|---|---|
| 6,118,402 | A | 9/2000 | Küpfer | 342/149 |
| 6,269,306 | B1 | 7/2001 | Ibrahim et al. | 701/214 |
| 6,353,412 | B1 | 3/2002 | Soliman | 342/387 |

*Primary Examiner*—Richard M. Camby
(74) *Attorney, Agent, or Firm*—Woodcock Washburn LLP

(57) ABSTRACT

A geolocation method is applied for accurate targeting of a target using an airborne beacon as a pseudo star generated by a high altitude vehicle, and using optical sensors by a low altitude vehicle for imaging the beacon and target for generating accurate relative GPS positioning of the target for improved the geolocation of the target preferably for precise delivery of a payload to the target. The method is applicable to military and civilian needs for accurate delivery of a payload to a target, such as for precise delivery of humanitarian aid or weapon munitions.

26 Claims, 3 Drawing Sheets

TWO DIMENSIONAL ALIGNED BORESIGHT GEOMETRY

TWO DIMENSIONAL ALIGNED BORESIGHT GEOMETRY

ALIGNED TARGET AND BEACON SENSOR

TARGET GEOLOCATION DETERMINATION
AND PAYLOAD MANUEVER PROCESS

GPS AIRBORNE TARGET GEOLOCATING METHOD

Matter enclosed in heavy brackets [ ] appears in the original patent but forms no part of this reissue specification; matter printed in italics indicates the additions made by reissue.

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of guided airborne payloads and geolocation methods used by airborne vehicles. More particularly, the present invention relates to reference beacon geolocation methods by airborne beacon reference vehicles cooperating with airborne target-geolocating unmanned vehicles.

BACKGROUND OF THE INVENTION

Stationary beacons, such as stars or ground-based reflectors, optical beams, and radar transponders, are commonly used as geolocation references. Examples of stationary-beacon geolocating systems includes split-field and star reference systems. Split-field reference attitude systems superimpose star images on photographs of ground objects. With knowledge of the latitude and longitude of the sensor platform and the time of day, the coordinates of objects in the photograph can be determined relative to star images on the film. Star-reference attitude systems perform a similar function. Portable radar transponders can be used as references as well for geolocating a target. In one application, the transponders are deployed by ground troops to designate the position of a nearby ground target for bomber aircraft. Surveyed latitude and longitude offsets from a target location relative to the beacon location appear as electronic blips on aircraft radar displays to indicate the target location to the bomber pilot. In other applications, flashlight infrared beacons allow individual soldiers to indicate their locations to helicopter pilots who can see the beacons with their night vision goggles. Target offsets relative to the soldiers' positions are radioed to the pilots for close-air-support missions.

To avoid risk to manned-piloted missions, unmanned vehicles are becoming widely used for surveillance and targeting of military, terrorist, and civilian targets. Technology trends include fire and forget smart munitions with communications networking and information sharing with unmanned vehicles both as sensor platforms and as weapon platforms using smaller bombs for striking multiple targets while reducing collateral damage and reducing logistics tails. More capable unmanned vehicles are to be widely deployed in future conflicts in aid of advanced tightly integrated command and control functions through the use of advanced communications technologies. An unmanned vehicle can loiter in a search area and perform real time surveillance so that operators at remote sites can designate targets, release stand-off smart bombs or missiles, and then acquire damage assessment in real time. Unmanned vehicles can be adapted for dropping large numbers of low-cost precision-guided miniature bombs that separately target respective targets.

Targeting sensors using infrared sensing and mounted on unmanned vehicles have about a one foot resolution from about 5000 feet altitude but suffer from geolocation errors that may be as high as 100 feet due to poor altitude determinations. Bombers and satellites use star trackers to obtain precise altitude determinations. Star trackers could be adapted for low altitude unmanned vehicular operations, but star trackers are expensive and operationally complex, and unsuitable for cloudy environs. Stars for star tracking may not be visible from aircraft flying at low altitudes below the clouds. As such, star tracking may not always be suitable as a means for attitude determination for low altitude unmanned vehicles. Though widely employed, stationary beacons are not often suitable for calibrating the boresight pointing angles of aircraft-based sensors. Also, it may not always be feasible at times to place ground beacons close to targets of interest.

Militarily, present trends are toward smaller and smarter weapons to precisely strike targets, such as trucks, fuel depots, power generators, missile sites, and terrain sites for obstructing moving ground vehicles, all executed with minimal collateral damage to civilian centers. Remotely viewed damage assessments are also desirable for collateral damage verification. Precision-guided nonlethal weapons are also playing increasing roles in foreign affairs where international opinion is considered. With growing trends toward civilization infrastructure rebuilding in remote areas, foreign diplomatic missions need highly accurate means of delivering human aid and materials to depressed friendlies in remote populations centers, without inadvertently aiding enemy units. With the prospects of precision global positioning systems (GPS), airborne unmanned vehicular systems and methods are needed to provide accurate geolocating and targeting of both civilian and military ground targets.

A seeker with homing guidance can be used to achieve one foot or less miss distance accuracy required to enable a miniature bomb to be an effective precision-strike weapon released from a stand-off distance. Such seekers may require risky proximal release from a mother vehicle. Relative GPS navigation using pseudo star navigation can provide ten foot accuracy using simple seekers released from a low flying unmanned vehicle for providing a shorter range to target without risk to an overflying reference manned vehicle. Miniature precision guided bombs dropped from unmanned vehicles could harass and disrupt enemy movements and operation over wide areas without risks to pilots and with reduced risk to civilian centers. However, a maneuvering payload using conventional GPS navigation can not achieve a miss distance that is sufficiently accurate for miniature bombs. Miniature precision-guided weapons have a maneuvering radius that is determined by the acquisition range above a target and the lateral acceleration capability of the seekers. The field of view of the seeker is a limiting factor at very short acquisition ranges in the presence of high lateral acceleration capability. The cost of a smart seeker is proportional to the square of the acquisition range times the area of the field of view at the time of target acquisition. The size of the optical system and associated image stabilization systems is proportional to the square of the range where the computational complexity of target recognition depends on ambiguities in determining the target point, and this computation complexity is proportional to the area of the field of view. That is, the more precise the initial geolocation of the target by a target acquisition sensor, the shorter the required acquisition range and the smaller the area of the field of view. Reducing the target geolocation error and hence the required maneuver radius significantly reduces the seeker complexity. Conventional seekers with associated guidance processors have expensive precision optical components for guidance control for reducing the target geolocation errors that can presently resolve fine features such as windshields or exhaust pipes of moving vehicles. Hence, present geolocating and targeting systems do not provide inexpensive yet highly accurate homing seekers. These and other disadvantages are solved or reduced using the invention.

SUMMARY OF THE INVENTION

An object of the invention is to provide a method for locating a target.

Another object of the invention is to provide a method for locating a target using relative GPS navigation.

Yet another object of the invention is to provide a method for locating a target using relative GPS navigation for delivering a payload to the target.

A further object of the invention is to provide a method for locating a target using relative GPS navigation between a high altitude beacon platform transmitting a beacon, and a low altitude sensor platform for imaging the beacon using a beacon sensor, and for imaging the target using a target sensor.

Yet a further object of the invention is to provide a method for locating a target using relative GPS navigation between a high altitude beacon platform communicating a beacon, and a low altitude sensor platform for imaging the beacon using a beacon sensor having a beacon field of view, and for imaging the target using a target sensor having a target field of view both of which field of views have a common aligned boresight.

The invention is directed to a method for relative GPS navigation and targeting. Using a precise GPS relative positioning method, a beacon from an overflying aircraft can be used to reference boresight pointing angles of low altitude airborne sensors for significantly improving the geolocation accuracy of the target relative to low altitude sensor platforms. The high altitude vehicle is a beacon platform for providing the beacon as a reference. The low altitude vehicle is a sensor platform for imaging the beacon and for imaging the target. The beacon sensor and target sensor preferably have common aligned boresights for accurate imaging of the beacon relative to the target. The beacon platform and sensor platform use the same four GPS satellites for respective GPS position determinations. Both the beacon platform position and sensor platform position have approximately the same GPS positioning errors that cancel out in the relative GPS navigation solution, so that the relative GPS positioning error between two GPS navigation solutions is small. As such, precise offsets provided by relative GPS navigation provides highly accurate targeting. The sensor platform can determine the relative GPS location and precise target location for accurately guiding a maneuvering payload toward the target location.

The method improves the geolocation accuracy of airborne beacons that can be applied to the development of low-cost seekers for miniature precision-guided bombs, which can be carried by the low altitude sensor platform. The method reduces the target geolocation error for resolving aim-point ambiguities. The method can be used with seeker feature-recognition algorithms that can recognize distinct features, such as a windshield of a vehicle, and reduces the need for more complicated algorithms that must be able to select a particular vehicle among several similar vehicles. The geolocation method can also be used in other applications where improved boresighting accuracy is required and relative GPS navigation techniques can be employed. These and other advantages will become more apparent from the following detailed description of the preferred embodiment.

DETAILED DESCRIPTION OF THE PREFERRED EMBODIMENT

Figure 1:
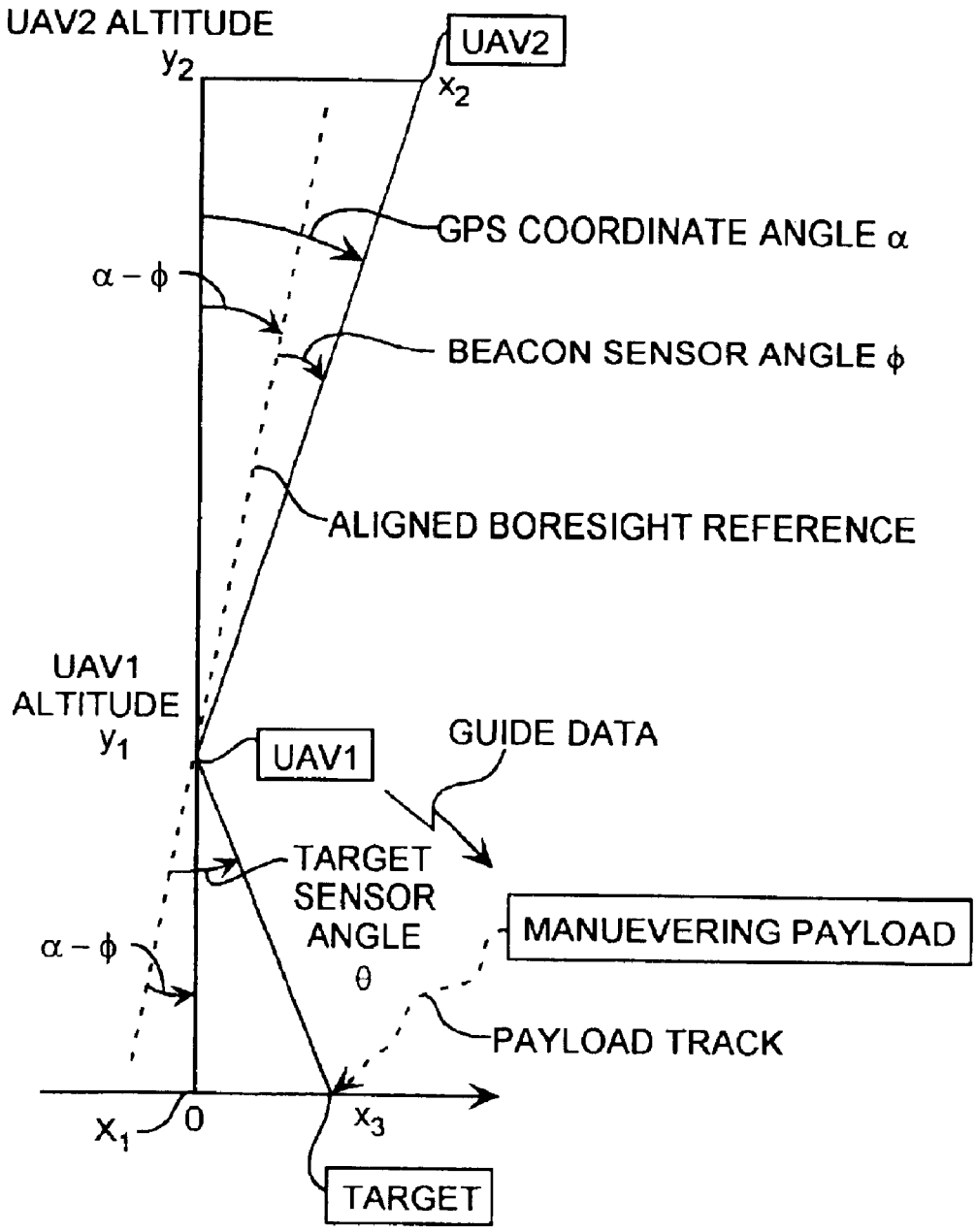
FIG. 1 shows an aligned boresight geometry.
Figure 2:
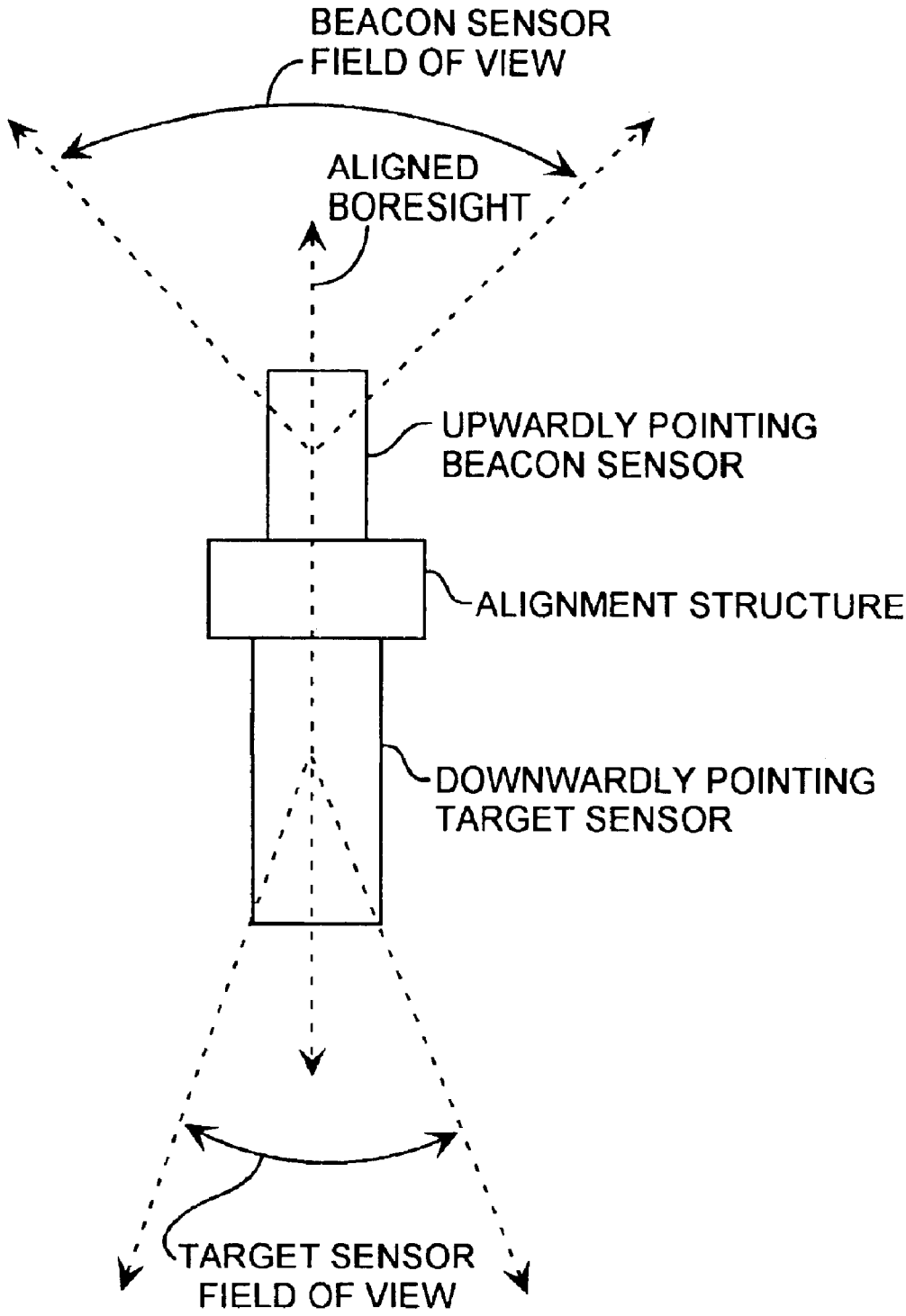
FIG. 2 shows an aligned target and beacon sensor.

An embodiment of the invention is described with reference to the figures using reference designations as shown in the figures. Referring to FIGS. 1 and 2, many systems implementations can practice the method, including a GPS artificial star airborne boresighting system. The preferred system implementation includes an acquisition unmanned airborne vehicle UAV1 at a $y_1$ low altitude relative to an $x_1=0$ horizontal reference, and a beacon unmanned airborne vehicle UAV2 at a high altitude $y_2$, at an $x_2$ horizontal position. The UAV1 is a sensor platform and the UAV2 is a beacon platform. The UAV1 preferably includes a target and beacon sensor assembly as shown in FIG. 2, a GPS receiver, and two-way communication equipment, both not shown. The UAV2 preferably includes a steerable beacon generator, for providing a beacon, a GPS receiver, and two-way communication equipment, all not shown. GPS receivers and two-way communication equipment are well known.

The downwardly pointing target sensor is mounted on UAV1 for imaging a target within a target sensor field of view. The target sensor could be a visible, ultraviolet, or infrared sensor. The upwardly pointing beacon sensor is mounted on UAV1 for the imaging beacon of the UAV2. Both the beacon sensor and target sensor have a common boresight reference centered within the upwardly pointing beacon field of view and downwardly pointing target field of views. An alignment structure is used for coincidentally aligning the boresights of the beacon sensor and target sensor so that both have a common boresight used as an angular reference. The target and beacon sensors are preferably in a fixed back-to-back alignment as a compact configuration using the alignment structure. The beacon sensor may be gimballed with respect to the target sensor to allow a wider beacon field of view for receiving the beacon signal that allows in turn increased flexibility in positioning UAV2 with respect to UAV1.

The beacon from UAV2 is imaged by the beacon sensor of UAV1. The beacon is a narrow directional beam that is preferably a laser beam and brighter than stars for improved imaging of the beacon from background noise. The laser beam is directly pointed at the low altitude UAV2. The laser beam has selected wavelengths for maximum cloud penetration, such as visible, ultraviolet or infrared wavelengths. The beacon sensor is preferably a low-cost, all-aspect fish-eye solid-state device preferably using gratings to precisely measure the angles to the reference beacon. The beacon image appears as a point source, similar to a star, which allows an offset angle of the beacon image to be precisely measured with respect to the beacon sensor boresight. To avoid detection, spoofing or jamming of the beacon, the beacon could be implemented as an encrypted sequence of pulses, which could be synchronized to the receiver using GPS time. As such, both UAV1 and UAV2 have GPS receivers that would receive precise timing information.

The narrow beam beacon can be accurately pointed at UAV1 because the relative positions of UAV1 and UAV2 can be derived from GPS measurements. The beacon UAV1 is a beacon platform that can also be used for telemetry data relay from the target sensor to ground controllers. Remote command and control centers, not shown, may receive the data via conventional communication links from UAV1 and UAV2. Such data may include a target sensor image, a beacon sensor image, UAV1 GPS receiver position and time, and UAV2 GPS receiver position and time. With this data, the relative GPS coordinates of a target may be selected by an operator at the remote command and control centers. The position of the target with respect to UAV1 can be computed with very high accuracy, on the order of ten feet. A maneuvering payload using relative GPS navigation and with homing guidance can achieve a small miss distance suitable for accurate miniature bombs. With relative GPS navigation and with homing guidance, a one-foot accuracy can be achieved by short-range terminal seekers having automatic target recognition and aim-point selection, at low cost for providing cost-effective accurate miniature smart-bomb weapons. Hence, the maneuverable payload is a small, low cost, smart seeker that achieves miss distances of less than one foot. The seeker with an associated homing guidance processor can be inexpensive using conventional consumer digital camera technology, including CCD arrays, plastic lenses, and microprocessors.

Figure 3:
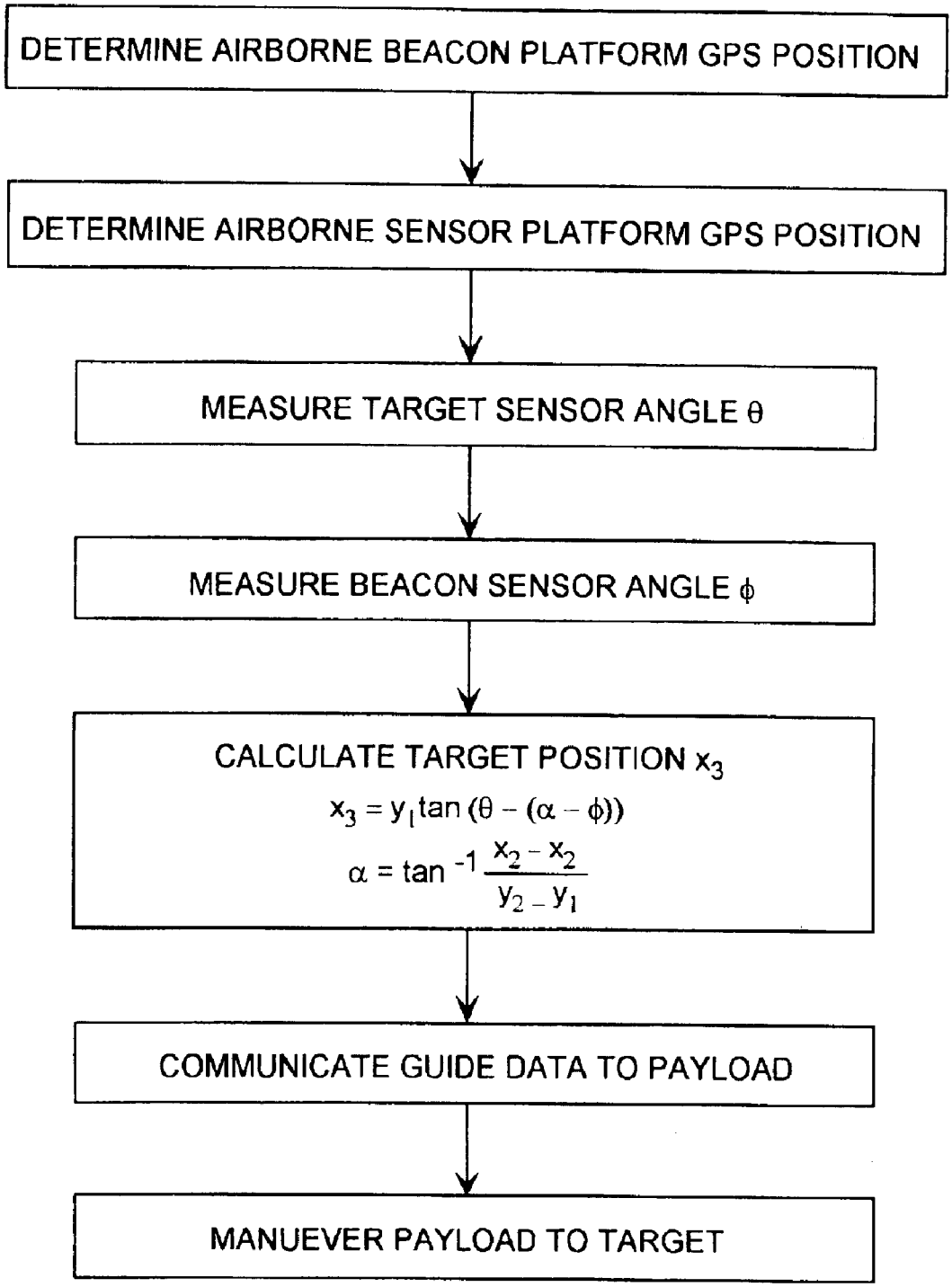
FIG. 3 is a flow chart of a target geolocation determination process.

Referring to all of the figures, and particularly to FIG. 3, a process is used for determining the position of the target so that precise targeting information can be communicated to the maneuvering payload so that the maneuvering payload can maneuver along a payload track toward the target when seeking the target for delivering a payload to the target. The UAV2 at $y_2$ and $x_2$ has a GPS position. The beacon from the UAV2 defines a reference boresight angle $\alpha$ as a GPS coordinate angle. The beacon is received by the beacon sensor of the UAV1 at $y_1$ and $x_1$ position for measuring a reference sensor angle $\phi$ off the aligned boresight having the reference boresight angle $\alpha$. The target sensor of the UAV1 is used for measuring a target sensor angle $\theta$, which is the angular difference between the boresight and target. Target offset from the $x_1=0$ reference is $x_3$ where $x_3=y_1 \tan[\theta+\phi-\alpha]$ where $\alpha=\arctan(x_2/(y_2-y_1))$. The angles $\theta$, $\phi$, and $\alpha$, and distances y1, y2, x2 and x3 are used for calculating precisely the target position.

The method determines the position of a target. The method preferably is used to communicate target guide data to a maneuvering payload maneuvering towards the target for delivering a payload to the target. A high altitude airborne beacon vehicle, such as UVA2, is a beacon platform that determines the beacon platform location by GPS navigation. The low altitude airborne sensor vehicle, such as UVA2, is a sensor platform that determines the sensor platform location by GPS navigation. The sensor platform uses the beacon sensor to form a beacon image within the beacon field of view, from the beacon platform using a beacon sensor, and forms a target image of the target within the target sensor field of view using the target sensor. The beacon and target images can appear within a calibrated composite image for measuring the beacon sensor angle $\phi$ and the target sensor angle $\theta$. The calibrated composite image can be a horizontal plane having x and z axes and referenced to a common alignment point of the boresight. The beacon sensor has a beacon sensor focal plane centered about the common boresight and the beacon sensor focal plane is calibrated to the beacon sensor angle $\phi$. The target sensor has a target sensor focal plane centered about the common boresight and the target sensor focal plane is calibrated to target sensor angle $\phi$. Those skilled in the art are adept at fashioning optical sensors having calibrated focal planes for measuring angles to images within the field of view of the sensors. Preferably, the beacon and target sensors are aligned by the common boresight so that the beacon image and target image are referenced to the common boresight so that calibrated composite image provides accurately measured beacon and target sensor angles. The composite image, can be, for example, a horizontal image with a center common boresight crosshair location, with the beacon and target images appearing relative to the center boresight location. The composite image is calibrated to angles, so that, the beacon image and the target image on the composite image can be calibrated together for precise measuring of the beacon sensor angle $\phi$ and the target sensor angle $\theta$. The composite image provides a planar x-z coordinate frame for both horizontal x and z axes as references in a horizontal plane so that x and z beacon and target angles can be measured. The computation of a $z_3$ axis location is the same for computation of the $x_3$ axis location. Only the $X_3$ computation is described in detail for convenience.

After the determining GPS position of the beacon platform, the beacon platform then communicates the $y_1$ altitude and $x_2$ distance to the sensor platform. The sensor platform measures the target angle $\theta$ and measures the beacon sensor angle $\phi$ using the calibrated sensors having a calibrated focal plane in reference to a calibrated composite image. The beacon platform GPS position is at the $y_1$, altitude with an $x_1$ and $z_1$ horizontal position, and the target platform GPS position has a $y_2$ altitude and an $x_2$ and a $z_2$ horizontal position. The beacon offset angle comprises the angles of $\phi_x$ and $\phi_z$, and the target offset angle comprises the angles of $\theta_x$ and $\theta_z$. The target location is a horizontal location at $x_3$ and $z_3$. A computer, for example, on the sensor platform can compute the $x_3$ coordinate, as well as an $z_3$ coordinate for accurate relative target geolocation defined by an $x_3$ and $z_3$ coordinates of the target location. The sensor platform can then communicate the $x_3$ and $z_3$ target location to the maneuvering payload. The maneuvering payload determines the payload location also be relative GPS navigation. Upon reception of the $x_3$ and $z_3$ target coordinates, the maneuvering payload can then maneuver from the payload GPS location toward the $x_3$ and $z_3$ coordinates along a payload track to deliver a payload to the target at the target location. The maneuvering payload can be a smart bomb having GPS navigation. The maneuvering payload, beacon platform and the sensor platform all have the same relative GPS errors. Hence, the $x_3$ and $z_3$ target coordinates are accurate relative to the GPS navigation solution of the maneuvering payload. As such, the target is precisely targeted by the maneuvering payload, that is, precisely located relative to the payload GPS navigation solution.

The sensor platform can support a plurality of maneuvering payloads, released in turn or in mass. Also, the sensor platform can provide continuous $x_3$ and $z_3$ coordinate updates over time, for example in the case of a moving target, so as to guide the maneuvering payload toward the moving target. The method could compute the altitude of the target, but would have high relative errors as the sensors are calibrated insensitive to y altitude variations of the target, but accurate to x and z horizontal variations. Typically, the $x_3$ and $z_3$ coordinate information is related to a three dimensional terrain map, where altitude determinations are less accurate than relative GPS positioning, but deemed insignificant because the trajectory of the payload track is often substantially vertical, which significantly reduces the effect of altitude positioning errors.

An overall targeting error can be calculated using offset errors. The target offset error is $\Delta x_3$ and $\Delta x_3 = y_1[\Delta\theta + \Delta\phi - \Delta x_2/(y_2 - y_1)]$. The $y_1$ and $y_2$ altitude errors are deemed insignificant due to the substantially vertical trajectory of the maneuvering payload. The term $\Delta x_2$ is the error in determining $x_2$ from relative GPS measurements. The term $\Delta x_3$ is the error in calculating $x_3$ based on $\theta$, $\phi$, $x_2$, $y_1$ and $y_2$. The term $\Delta\theta$ is the error in determining $\theta$ from target sensor measurements relative to the target sensor boresight axis. The term $\Delta\phi$ is the error in determining $\phi$ from beacon sensor measurements relative to the beacon sensor boresight axis. Standard deviation of target offset error is $\sigma_3$ and $\sigma_3 = y_1[\Delta\sigma_{100}{}^2 + \Delta\sigma_\phi{}^2 + \Delta\sigma_\phi{}^2(y_1 - y_1)^2]^{0.5}$ The term $\sigma_2$ is the standard deviation of $\Delta x_2$. The term $\sigma_3$ is the standard deviation of $\Delta x_3$. The term $\sigma_{74}$ is the standard deviation of $\Delta\theta$. The term $\sigma_\phi$ is the standard deviation of $\Delta\phi$. The standard deviation $\sigma_3$ can be used for computing error budgets, and hence the expected precision of the maneuvering payload.

The UAV1 target sensor has adequate resolution, such as one foot. The relative GPS navigation solution reduces the GPS geolocation of one hundred feet to less than ten feet. The UAV2 mounted beacon functions as an artificial star for providing a reference beacon for relative GPS positioning. The back-to-back boresight alignment of the beacon and target sensors allows for accurately calibrated sensing the targets below the UVA1 and beacons above the UVA1, all of which can be simultaneously imaged by the UAV1. The target sensor boresight alignment can be fixed relative to the beacon sensor boresight alignment for providing accurate common boresight alignment. The sensors could be gimbal mounted for more flexible pointing of the sensors towards both the beacon platform and the target.

The sensor platform, beacon platform and maneuvering payload can all use the same four GPS satellites to determine respective GPS positions. Beacon and target angles from the beacon and target sensors are measured relative to GPS navigation solutions. The horizontal offset to the maneuvering payload trajectory can be very accurately determined using calibrated sensors and relative GPS navigation. The invention provides for improved targeting for reducing the required acquisition range and acquisition time of the homing seeker of the maneuvering payload and reduced lateral acceleration requirements. The acquisition range can be reduced to about 100 feet, which significantly reduces the size and cost of the terminal seeker, and reduces lateral acceleration requirements. The method can be applied to seekers for miniature precision-guided smart bombs, which can be carried by a low altitude unmanned vehicle, using low cost calibrated sensor optics, focal planes, processors, and pattern recognition software. Those skilled in the art can make enhancements, improvements, and modifications to the invention, and these enhancements, improvements, and modifications may nonetheless fall within the spirit and scope of the following claims.

What is claimed is:

1. A method for determining a target location of a target, the method comprising the steps of, sensor determining a first GPS position of a sensor platform, the first GPS position having GPS positioning errors, beacon determining a second GPS position of a beacon platform, the second GPS position having GPS positioning errors, the first and second GPS positions having relative errors less than the GPS positioning errors, beacon measuring a beacon offset angle, target measuring a target offset angle, and computing the target location of the target from the first and second GPS positions and the beacon offset angle and the target offset angle.

2. The method of claim 1 further comprising the steps of, determining a third GPS position of a maneuvering payload, communicating the target location of the target to the maneuvering payload, and maneuvering payload toward the target location.

3. The method of claim 1 further comprising the steps of, determining a third GPS position of a maneuvering payload, communicating the target location of the target to the maneuvering payload, maneuvering payload toward the target location, and repeating all of the steps for repetitively communicating the target location of the target to the maneuvering payload while the maneuvering payload maneuvers along a payload track towards the target.

4. The method of claim 1 wherein, the first GPS position has a $y_1$ altitude and an $x_1$ and a $z_1$ horizontal position, the second GPS position has a $y_2$ altitude and an $x_2$ and a $z_2$ horizontal position, the beacon offset angle comprises the angle of $\phi_x$ and $\phi_z$, the target offset angle comprises the angles of $\theta_x$ and $\theta_z$, and the target location is a horizontal location at $x_3$ and $z_3$.

5. The method of claim 1 wherein, the first GPS position has a $Y_1$ altitude and an $x_1$ horizontal position, the second GPS position has a $Y_2$ altitude and an $x_2$ horizontal position, the beacon offset angle comprises the angle of $\phi_x$, the target offset angle comprises the angles of $\theta_x$, and the target location is a horizontal location at $x_3$, where $x_3 = y_1 \tan[\theta_x + \phi_x - \alpha_x]$ where $\alpha_x = \arctan(x_2/(y_2 - y_1))$.

6. The method of claim 1 wherein the beacon measuring step comprises the step of, calibrating a focal plane of a beacon sensor of the sensor platform for measuring the beacon offset angle.

7. The method of claim 1 wherein the target measuring step comprises the step of, calibrating a focal plane of a target sensor of the sensor platform for measuring the target offset angle.

8. The method of claim 1 wherein, the beacon measuring step comprises the step of calibrating a beacon focal plane of a beacon sensor of the sensor platform for measuring the beacon offset angle, the target measuring step comprises the step of calibrating a target focal plane of a target sensor of the sensor platform for measuring the target offset angle, and the calibrating of the beacon and target focal plane is relative to respective fields of view of a common boresight.

9. A method for delivering a payload to a target location of a target, the method comprising the steps of, determining a first GPS position of a sensor platform, determining a second GPS position of a beacon platform, the first and second GPS positions having relative errors, measuring a beacon offset angle, measuring a target offset angle, computing the target location of the target from the first and second GPS position and beacon offset angle and target offset angle, determining a third GPS position of a maneuvering payload, communicating the target location to the maneuvering payload, and maneuvering payload toward to the target location for delivering the payload to the target location.

10. The method of claim 9 wherein maneuvering payload is a smart bomb comprising GPS navigation, guide communications, and a munitions payload.

*11. A method for determining a target location of a target, comprising:*

*determining a first GPS position of a sensor platform;*

*determining a second GPS position of a beacon platform;*

*determining a beacon offset angle;*

*determining a target offset angle; and*

*determining the target location from at least the first and second GPS positions and the beacon offset angle and the target offset angle.*

*12. The method of claim 11, further comprising:*

*determining a third GPS position of a maneuvering payload; and*

*communicating the target location to the maneuvering payload.*

*13. The method of claim 12, further comprising guiding the maneuvering payload toward the target location.*

*14. The method of claim 12, further comprising repetitively communicating the target location to the maneuvering payload while the maneuvering payload maneuvers along a payload track towards the target.*

*15. The method of claim 11, wherein*

*the first GPS position has a $y_1$ altitude and an $x_1$ and a $z_1$ horizontal position, the second GPS position has a $y_2$ altitude and an $x_2$ and a $z_2$ horizontal position;*

*the beacon offset angle comprises the angle of $\phi_x$ and $\phi_z$;*

*the target offset angle comprises the angles of $\theta_x$ and $\theta_z$; and*

*the target location is a horizontal location at $x_3$ and $z_3$.*

*16. The method of claim 11 wherein,*

*the first GPS position has a $y_1$ altitude and an $x_1$ horizontal position, the second GPS position has a $y_2$ altitude and an $x_2$ horizontal position;*

*the beacon offset angle comprises the angle of $\phi_x$;*

*the target offset angle comprises the angle of $\theta_x$; and*

*the target location is a horizontal location at $x_3$, where $x_3=y_1 \tan[\theta_x+\phi_x-\alpha_x]$ where $\alpha_x=arctan(x_2/(y_2-y_1))$.*

*17. The method of claim 11, wherein said determining of the beacon offset angle comprises calibrating a focal plane of a beacon sensor of the sensor platform for measuring the beacon offset angle.*

*18. The method of claim 11, wherein said determining of the target offset angle comprises calibrating a focal plane of a target sensor of the sensor platform for measuring the target offset angle.*

*19. The method of claim 11, wherein*

*said determining of the beacon offset angle comprises calibrating a beacon focal plane of the beacon sensor of the sensor platform for measuring the beacon offset angle,*

*said determining of the target offset angle comprises calibrating a target focal plane of the target sensor of the sensor platform for measuring the target offset angle, and*

*said calibrating of the beacon and target focal plane is relative to respective fields of view of a common boresight reference.*

*20. The method of claim 11, further comprising relating the target location to a three dimensional map to determine an altitude of the target.*

*21. A method for delivering a payload to a target comprising:*

*determining a first GPS position of a sensor platform;*

*determining a second GPS position of a beacon platform;*

*determining a beacon offset angle;*

*determining a target offset angle;*

*computing a location of the target from at least the first and second GPS position and beacon offset angle and target offset angle;*

*determining a third GPS position of a maneuvering payload;*

*communicating the location of the target to the maneuvering payload; and*

*maneuvering the payload toward the location of the target.*

*22. The method of claim 21, wherein the maneuvering payload comprises a smart bomb.*

*23. The method of claim 22, wherein the smart bomb comprises GPS navigation, guide communications, and a munitions payload.*

*24. The method of claim 21, wherein the maneuvering payload comprises a humanitarian payload.*

*25. A computer readable medium comprising computer executable instructions that when executed by a computer system, perform the method of:*

*determining a first GPS position of a sensor platform;*

*determining a second GPS position of a beacon platform;*

*determining a beacon offset angle;*

*determining a target offset angle; and*

*computing a location of the target from at least the first and second GPS positions and the beacon offset angle and the target offset angle.*

*26. A computer programmed by software so as to perform the method of:*

*determining a first GPS position of a sensor platform;*

*determining a second GPS position of a beacon platform;*

*determining a beacon offset angle;*

*determining a target offset angle; and*

*computing a location of the target from at least the first and second GPS positions and the beacon offset angle and the target offset angle.*

* * * * *

UNITED STATES PATENT AND TRADEMARK OFFICE

CERTIFICATE OF CORRECTION

PATENT NO. : RE 39,620 E
APPLICATION NO. : 11/084867
DATED : May 8, 2007
INVENTOR(S) : Patrick Lawrence Smith It is certified that error appears in the above-identified patent and that said Letters Patent is hereby corrected as shown below:

Column 1, line 8, insert

-- CROSS-REFERENCE TO RELATED APPLICATIONS

This patent is a reissued patent of United States Patent No. 6,535,816 issued March 18, 2003, and entitled "GPS Airborne Target Geolocating Method." This patent is also related to pending U.S. Application Serial No. 11/552,323 filed October 24, 2006, and pending U.S. Application Serial No. 11/703,050 filed February 6, 2007, both of which are divisional applications of the reissue application 11/084,867 from which the present patent issued. --.

Signed and Sealed this

Eleventh Day of November, 2008

JON W. DUDAS
*Director of the United States Patent and Trademark Office*